US008892438B2

(12) United States Patent
Gorin et al.

(10) Patent No.: US 8,892,438 B2
(45) Date of Patent: Nov. 18, 2014

(54) APPARATUS AND METHOD FOR ANALYSIS OF LANGUAGE MODEL CHANGES

(75) Inventors: Allen Louis Gorin, Berkeley Heights, NJ (US); John Grothendieck, Highland Park, NJ (US); Jeremy Huntley Greet Wright, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 395 days.

(21) Appl. No.: 12/881,665

(22) Filed: Sep. 14, 2010

(65) Prior Publication Data

US 2011/0093268 A1 Apr. 21, 2011

Related U.S. Application Data

(63) Continuation of application No. 11/085,382, filed on Mar. 21, 2005, now Pat. No. 7,805,300.

(51) Int. Cl.
*G10L 15/18* (2013.01)
*G10L 15/183* (2013.01)

(52) U.S. Cl.
CPC .............. *G10L 15/18* (2013.01); *G10L 15/183* (2013.01)
USPC ........................................................ 704/245

(58) Field of Classification Search
USPC ........................................................ 704/245
See application file for complete search history.

(56) References Cited

U.S. PATENT DOCUMENTS

| 6,529,902 | B1 * | 3/2003 | Kanevsky et al. ................. 707/5 |
| 8,160,883 | B2 * | 4/2012 | Lecoeuche ................. 704/270.1 |
| 8,165,883 | B2 * | 4/2012 | Galanes et al. ............... 704/270 |
| 8,224,650 | B2 * | 7/2012 | Galanes et al. ............ 704/270.1 |
| 8,229,753 | B2 * | 7/2012 | Galanes et al. ............ 704/270.1 |
| 2002/0128821 | A1 * | 9/2002 | Ehsani et al. .................... 704/10 |
| 2002/0184016 | A1 * | 12/2002 | Hartley et al. ................. 704/235 |
| 2003/0033333 | A1 * | 2/2003 | Nishino et al. ................ 707/531 |
| 2003/0065655 | A1 * | 4/2003 | Syeda-Mahmood ............. 707/3 |
| 2003/0088397 | A1 * | 5/2003 | Karas et al. ....................... 704/1 |
| 2004/0049388 | A1 | 3/2004 | Roth et al. |
| 2004/0249637 | A1 * | 12/2004 | Baker .......................... 704/239 |
| 2005/0075875 | A1 * | 4/2005 | Shozakai et al. .............. 704/231 |
| 2008/0015858 | A1 * | 1/2008 | Bossemeyer, Jr. ............ 704/243 |

OTHER PUBLICATIONS

A.P. Dempster et al., "Maximum Likelihood from Incomplete Data via the EM Algorithm", Journal of the Royal Statistical Society, Series B (Methodological), vol. 39, No. 1, (1997), pp. 1-38.

J. Mostow et al., "Viewing and Analyzing Multimodal Human-Computer Tutorial Dialogue: A Database Approach", Multimodal Interfaces, 2002, Proceedings, Fourth IEEE International Conference, Oct. 14-16, 2002, Piscataway, NJ, USA, IEEE, pp. 129-134, XP010624305.

J. Grothendieck, "Tracking Chances in Language", IEEE Transactions on Speech and Audio Processing, IEEE Service Center, New York, NY, US vol. 13, No. 5, Sep. 2005, pp. 700-711, XP002416756.

* cited by examiner

*Primary Examiner* — Michael N Opsansnick (57) ABSTRACT

An apparatus, a method, and a machine-readable medium are provided for characterizing differences between two language models. A group of utterances from each of a group of time domains are examined. One of a significant word change or a significant word class change within the plurality of utterances is determined. A first cluster of utterances including a word or a word class corresponding to the one of the significant word change or the significant word class change is generated from the utterances. A second cluster of utterances not including the word or the word class corresponding to the one of the significant word change or the significant word class change is generated from the utterances.

20 Claims, 5 Drawing Sheets

APPARATUS AND METHOD FOR ANALYSIS OF LANGUAGE MODEL CHANGES

PRIORITY INFORMATION

The present application is a continuation of U.S. patent application Ser. No. 11/085,382, filed Mar. 21, 2005, now U.S. Pat. No. 7,805,300, issued on Sep. 28, 2010, the content of which is included herewith in its entirety.

BACKGROUND OF THE INVENTION

1. Field of the Invention

The present invention relates to natural language spoken dialog systems, and more specifically to discovering changes in natural language used by callers of human/computer interactive systems.

2. Introduction

Modern computers can understand natural language at a useful level. For example, existing natural language spoken dialog systems receive, process, and transcribe a caller's telephone audio signal automatically. Semantically loaded words allow a machine learning algorithm to build a classifier that performs well on a restricted domain. Yet as time passes, customer needs can evolve beyond the situations that arose within the training data. As a result, the automated classifier may not perform acceptably on novel requests. Recognizing such situations and retraining the classifier can help to maintain user satisfaction and prevent financial losses.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method is provided for characterizing differences between two language models. A group of utterances from each of a group of time domains are examined. One of a significant word change or a significant word class change within the utterances is determined. A first cluster of utterances including a word or a word class corresponding to the one of the significant word change or the significant word class change is generated from the utterances. A second cluster of utterances not including the word or the word class corresponding to the one of the significant word change or the significant word class change is generated from the utterances.

In a second aspect of the invention, an apparatus is provided. The apparatus includes at least one processor, a device for displaying output, and storage associated with the at least one processor. The storage includes instructions for the at least one processor. The apparatus is configured to perform examining a group of utterances from each of a group of time domains, determining one of a significant word change or a significant word class change within the utterances, generating, from the utterances, a first cluster of utterances including a word or a word class corresponding to the one of the significant word change or the significant word class change, and generating, from the utterances, a second cluster of utterances not including the word or the word class corresponding to the one of the significant word change or the significant word class change.

In a third aspect of the invention, a machine-readable medium is provided. The machine-readable medium includes a group of instructions for at least one processor. The machine-readable medium includes instructions for examining a group of utterances from each of a group of time domains, instructions for determining one of a significant word change or a significant word class change within the utterances, instructions for generating, from the utterances, a first cluster of utterances including a word or a word class corresponding to the one of the significant word change or the significant word class change, and instructions for generating, from the utterances, a second cluster of utterances not including the word or the word class corresponding to the one of the significant word change or the significant word class change.

In a fourth aspect of the invention, an apparatus is provided. The apparatus includes means for examining a group of utterances from each of a group of time domains, means for determining one of a significant word change or a significant word class change within the utterances, means for generating, from the utterances, a first cluster of utterances including a word or a word class corresponding to the one of the significant word change or the significant word class change, and means for generating, from the utterances, a second cluster of utterances not including the word or the word class corresponding to the one of the significant word change or the significant word class change.

BRIEF DESCRIPTION OF THE DRAWINGS

In order to describe the manner in which the above-recited embodiments and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Embodiments of the invention may provide information to a human expert to help the expert understand how spoken language for an application changes over time. Having an understanding of the reasons for changes in the spoken language over time, makes it easier for the expert to determine whether a spoken language classifier should be retrained. The classifier is that portion of a spoken language understanding system that labels an intent of an utterance.

Exemplary Processing System

Figure 1:
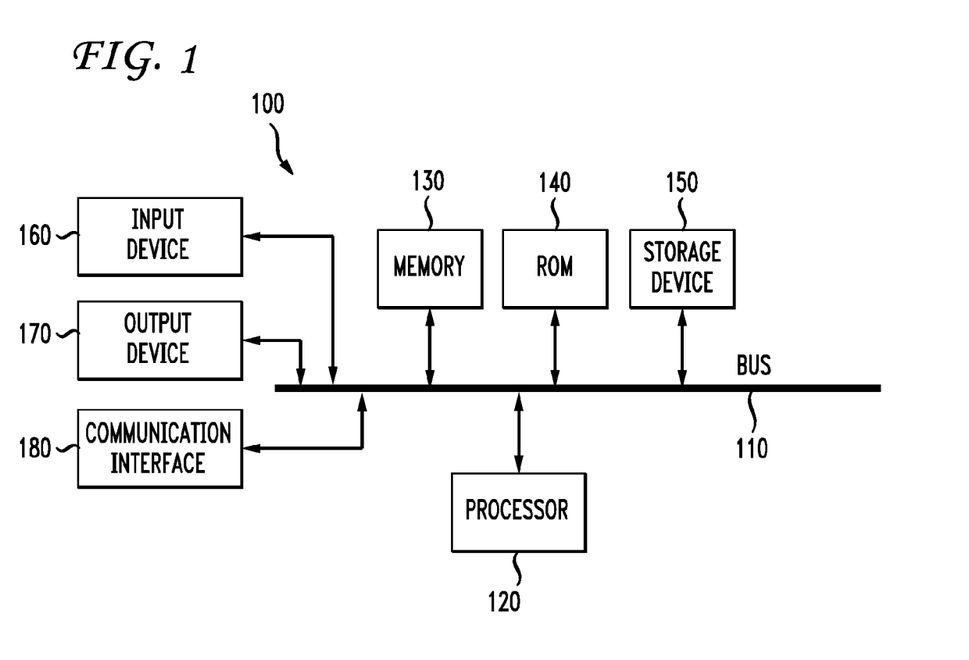
FIG. 1 illustrates an exemplary operating environment consistent with the principles of the invention.

FIG. 1 illustrates an exemplary processing system 100 that may be used to implement embodiments consistent with the principles of the invention. System 100 may include a bus 110, a processor 120, a memory 130, a read only memory (ROM) 140, a storage device 150, an input device 160, an output device 170, and a communication interface 180. Bus 110 may permit communication among the components of system 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive.

Input device 160 may include one or more conventional mechanisms that permit a user to input information to system 100, such as a keyboard, a mouse, a pen, a voice recognition device, etc. Output device 170 may include one or more conventional mechanisms that output information to the user, including a display, a printer, one or more speakers, or a medium, such as a memory, or a magnetic or optical disk and a corresponding disk drive. Communication interface 180 may include any transceiver-like mechanism that enables system 100 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

System 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Description of Problem

The essential problem is the characterization of differences between two related languages. One example is speech recognizer output for past customer transactions versus speech recognizer output for present transactions. While some research has attempted to adapt existing language models, there has been little attention to the nature of the differences among the language models. Statistical tests on individual elements of a model can generate a long list of significant differences. Given a sufficiently large data sample, hundreds of words may demonstrate shifts in their relative frequencies. Yet such shifts may be due to a far shorter list of causes.

The list of detected changes is extracted information while the causes would be extracted knowledge. Aspects consistent with the principles of the invention concern extraction of knowledge. Thus, tools that connect statistical changes in the language to a human appreciation of semantics are very useful. Classical tests may discover changes within the data. Implementations consistent with the principles of the invention attempt to extract intelligence about the changes thereby extending data mining beyond the mere discovery of unexpected patterns in the data.

A list of individual changes to the language may typically evince some internal structure. Characteristic words and phrases appear in utterances regarding a specific topic. Should a new topic emerge, those words appearing within its signature templates may exhibit stronger mutual associations than had been observed previously. Implementations consistent with the principles of the invention may identify and call attention to a set of related changes, and may identify a few transactions that seem representative of the changed utterances. Human judgment and a few moments of inspection may provide a label for each group.

Rather than attempting to build an explicit probability model for complicated data records, implementations consistent with the principles of the invention may cluster utterances based upon some notion of similarity and may present any group exhibiting changes to a human for evaluation. One plausible criterion for an "interesting" cluster may be a significant departure from the global distribution of utterance times. Thus, in one implementation consistent with the principles of the invention, a list of clusters may be prioritized by unexpected distribution in time and output to a human. Further inspection of such clusters may generate a smaller set of changes on a readily-describable subset of the population.

Comparing unigrams provides a natural starting point in analyzing a stream of conversations with meta-data. Even this simple language model may present challenges to knowledge extraction. When the relative frequency of a particular word shifts significantly in automatic speech recognition (ASR) output, it need not be appearing in a new context. Possible explanations may include a change in audio quality, consistent misrecognition of some other word, major changes to some other portion of the data having a secondary impact on the relative frequencies of common words, or simply a change in the probability of some known context. Situations which the automated system is not trained to handle or handles poorly are of concern. While study of text logs may not be a good approach to understanding audio or recognizer problems, there may be benefit in distinguishing among other types of changes, such as secondary known and novel changes.

Utterance Clustering

Here is an example using real data from a commercial application. An independent test on the relative frequency of each word in the ASR output for January against March 2002 gives the list shown in Table I. This presents the changed words ranked by the difference in log probability for the two months.

Closer examination of the data reveals a novel set of utterances in mid-January concerning mass mailings that warned customers of pending increases in the costs of various service plans. Presented with a list of unigram changes and access to the full data records, a human finds the cause of the many utterances containing "letter" in January without much difficulty. The different relative frequency of references to specific months is hardly unexpected given that the month has changed. A little knowledge of the domain explains the word "unlimited." A new calling plan was introduced with that name in February.

TABLE I

WORD PROBABILITY CHANGE LIST IS HMIHY. JANUARY VERSUS MARCH. THE CHANGE IN LOG PROBABILITIES AND UNADJUSTED STATISTICAL SIGNIFICANCE ARE SHOWN, ALONG WITH SELECTED MANUALLY-GENERATED WORD CLASSES.

| CLASS | WORD | Δ log (P) | P-VALUE |
|---|---|---|---|
|  | unlimited | +5.7 | 8.1e−63 |
| 1 | Reach | +5.5 | 1.1e−22 |
| 1 | Easy | +5.3 | 2.1e−18 |
|  | Ds | −5.1 | 1.4e−17 |
| 2 | June | +4.7 | 1.0e−24 |
| 2 | March | +2.8 | 6.6e−66 |
| 2 | February | +2.2 | 2.6e−36 |
| 2 | December | −2.2 | 7.8e−34 |
|  | letter | −1.5 | 4.0e−24 |
|  | balance | +0.8 | 1.4e−68 |
|  | talk | −0.6 | 1.5e−32 |
| 3 | distance | −0.5 | 1.9e−31 |
| 3 | long | −0.5 | 8.1e−31 |
|  | about | −0.4 | 6.2e−35 |
| 4 | T | −0.4 | 1.7e−30 |
| 4 | A | −0.4 | 9.1e−30 |
| . | . | . | . |
| . | . | . | . |
| . | . | . | . |
|  | wanna | +0.1 | 3.1e−04 |
|  | calling | −0.1 | 8.3e−04 |

Changes to other words may prove harder to understand, even in cases where coincidence is not plausible. Customers may use "about" in many different contexts. A change in one of many associated topics may explain the new behavior of the word. In fact, no simple cause may emerge; the observed decrease in probability may be a result of multiple factors. Even given considerable domain knowledge, the word list may have limited utility.

The entire list includes over 100 changes significant at $p=0.001$. Any insights the lower-scoring words might have shed on the causes of more important changes seem likely to be lost; people may be generally unwilling to go through such a long list. The results may be more useful in a format that presents groups of related changes. A human being may tend to seek classes within the full list. These intuitive groups may demonstrate several distinct patterns of change. Some words may be strongly associated within both time domains; some phrase may have a different relative frequency, e.g. "long distance." Other words such as letter, rate, and change may tend to co-occur in only one time domain. The month names (class 2) each may possess a distinctive profile in time; rather than appearing within the same phrase, they may tend to fulfill the same role in different utterances. Automatically extracting such different classes may present a challenge, but would be a major step towards discovering knowledge.

Associated meta-data fields can provide further insight into observed changes. Comparison of word probabilities for data sampled from consecutive days may reveal a periodic pattern within the customer service requests seen in the commercial data. Saturdays and Sundays may exhibit characteristic differences, as do Sundays and Mondays. Customer intents on the weekends may follow a different distribution. Tests reveal well over 100 significant changes in individual word probability (at $p=0.001$) when Sundays are compared with the following Monday, yet few changes may be typically detected between successive Sundays.

Word Peeling Process

The most direct approach to conditioning data records is by the presence or absence of particular words. Changes in word usage might be detected by simply investigating the sub-language consisting of all utterances containing that word for significant differences. A list of significant differences in unigram probabilities makes a starting point for further investigation. The most critical missing ingredient is simply identifying which changes are "important", which seems problematic without outside knowledge. Many score functions seem plausible. Some combination of the significance and magnitude of the estimated change in probability should direct attention to the more important changes in the language. With this, it becomes possible to identify those transactions containing the most important change. Tests upon the remainder of the data would be unaffected by the isolated change; any secondary effects disappear. Should the data still exhibit interesting behavior in time, the process may be repeated.

Figure 2:
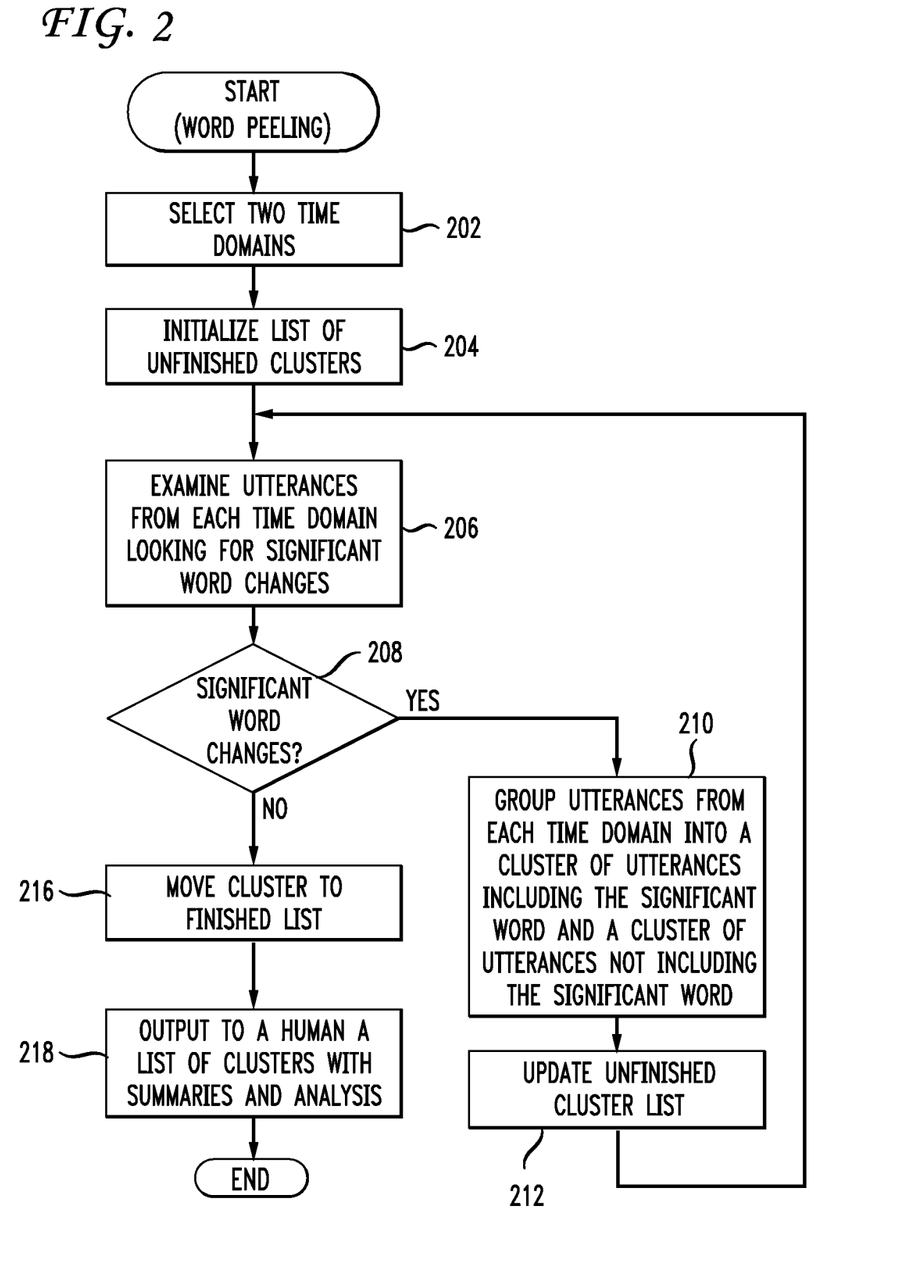
FIGS. 2 through 5 are flowcharts of exemplary processes that may be used in various implementations consistent with the principles of the invention.

These elements provide the word-peeling method. FIG. 2 is a flowchart of an exemplary implementation of the word-peeling method or process that may be performed by implementations consistent with the principles of the invention. The process may begin with processing system 100 selecting two time domains from which utterances may be analyzed (act 202). Processing system 100 may initialize a list of unfinished clusters (act 204). Initially, the list of unfinished clusters may contain a single cluster that includes all utterances from the two selected time domains.

Next, processing system 100 may examine utterances in the unfinished cluster from each time domain (act 206) and may determine whether any significant changes in frequency of occurrences of words has occurred (act 208). If no significant changes in frequency of occurrences of words occurred, then any unfinished clusters may be added to the finished cluster list (act 216) and a list of clusters with corresponding summaries and analysis may be output for a human to examine (act 218).

If, at act 208, processing system 100 determines that significant changes in frequency of occurrences of words did occur, then a cluster of utterances including a word with the most significant changes in frequency of occurrences may be generated from the utterances of each time domain within the unfinished cluster and a cluster of utterances that do not include the word may be generated from the utterances of each time domain within the unfinished cluster (act 210). Processing system 100 may then update the unfinished cluster list by removing, from the unfinished list, the data cluster from which the two new clusters were generated and by adding the two new clusters to the unfinished cluster list (act 212). Acts 206 through 212 may be repeated until no significant word changes are detected.

Word-peeling may lead to an explosion in the number of domains to consider. In practice, however, most branches created by the presence of a reference word swiftly terminate due to sparse data.

The domain splits may be likened to peeling an onion. After subpopulations containing certain words are peeled off, the bulk of the data for the two time domains may exhibit no significant changes. These splits may terminate in a partition of the data set into sub-populations characterized by the presence or absence of various words, in which no sufficiently interesting changes are detected across time domains to justify further division of the data.

Word-peeling may produce usable results but it can overlook important relationships among the individual words. In whatever manner change importance is assigned, the scoring function may have drawbacks. For example, focusing on absolute magnitude of a change may lead to early splits on such non-specific words such as, for example, "to" or "about,"

which may lead to languages not much simpler than the original language. Focusing on relative difference typically may assign too much weight to uncommon words, ranking as important the changes in language that are most likely to be false alarms. Employing both within the score may partially address these issues. A hasty focus on one particular variable value as interesting could ignore useful structure within the data. Thus a less direct approach to divisive analysis might yield better results.

Similar-Utterance Process

One alternative to explicit conditioning on words, that may be used in implementations consistent with the principles of the invention, is to divide the data stream into subpopulations using language entropy as a criterion. The general language model may be viewed as a mixture of more specific ones. Even noisy ASR output contains considerable structure that can be used to separate transaction records. Similar data records may be grouped together and used to train sub-models. Individual transactions within the data may be assigned to different clusters, including any meta-data fields such as time information, spoken language understanding (SLU) labels, customer segment, etc. This may provide a natural mechanism for organizing the data that does not require a complicated search through the space of Boolean conditions.

This methodology has arisen within the problem of creating optimal decision trees using a large, sparse set of covariates. Multiple covariates may separate the observations into isolated data points or very small equivalence classes. Rather than attempting to build an explicit map from the covariate values, a divisive algorithm finds the optimal split of some node built from these classes into two new leaves. The covariates then may provide a well-defined map into each leaf.

Figure 3:
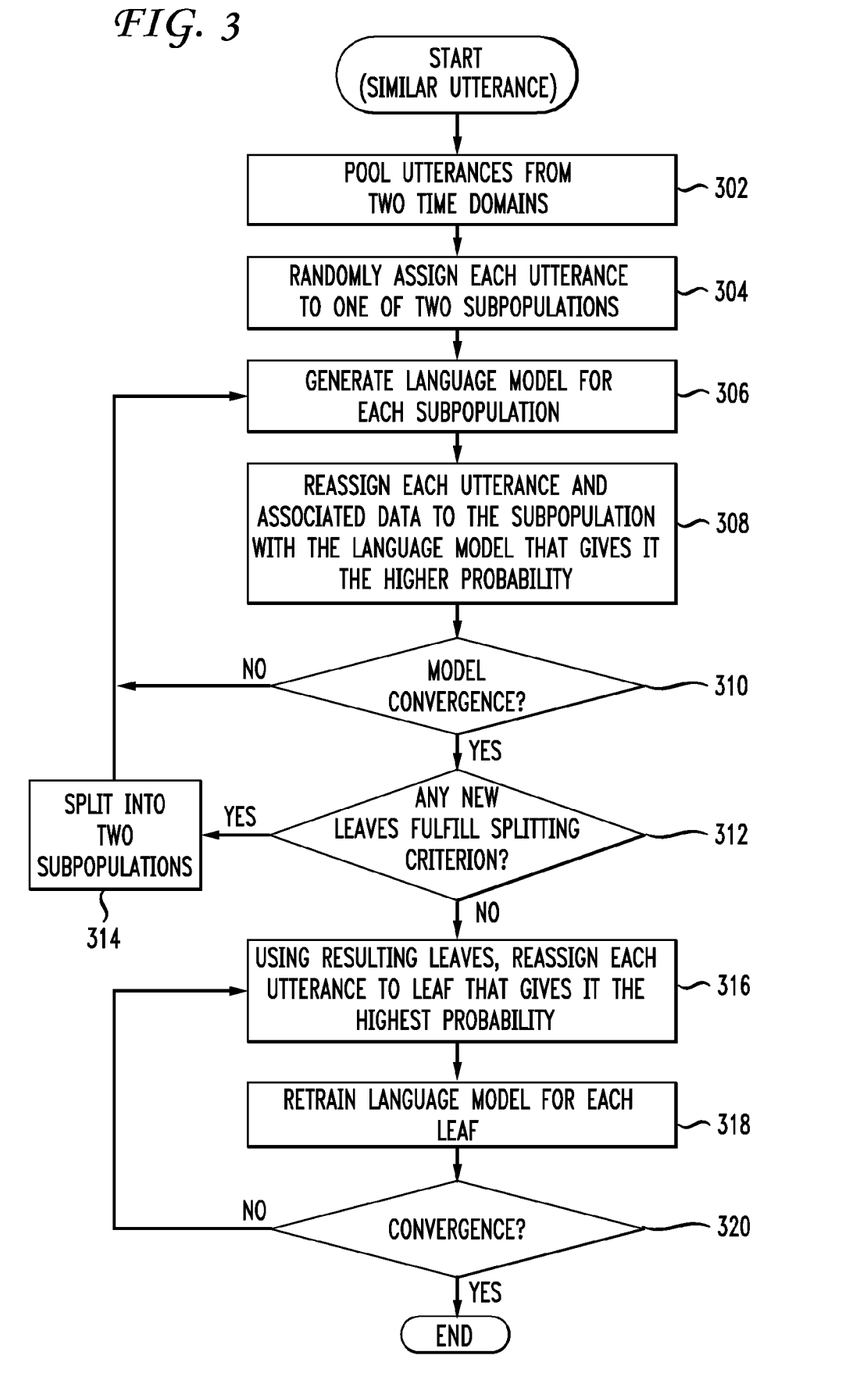

For language models, evaluating a split of the data involves checking the improvement in overall entropy that follows from generating a separate language model for each part. FIG. 3 is a flowchart of the similar-utterance process, which may be used in implementations consistent with the principles of the invention.

Processing system 100 may begin by pooling utterances from two time domains (act 302). Then, processing system 100 may randomly assign each utterance to one of two subpopulations (act 304). Processing system 100 may then generate a language model for each of the subpopulations (act 306). The language models may be generated by any well-known conventional method. Each utterance and associated data may then be reassigned to the subpopulation with the language model that gives the utterance the highest probability (act 308). Processing system 100 may then determine whether the models converged (act 310). If the models did not converge, then acts 306 through 310 may be repeated.

If the models have converged, the processing system 100 may determine whether any of the new leaves or subpopulations fulfill a splitting criterion (act 312). For example, the splitting criterion may include that splitting the cluster causes a decrease in language entropy by a threshold value. If any of the new leaves do fulfill the splitting criterion, then processing system 100 may split the leaves into two subpopulations, according to the splitting criterion (act 314) and acts 306 through 312 may be repeated.

If processing system determines, at act 312, that none of the new leaves or subpopulations fulfill the splitting criterion, then processing system 100 may reassign each utterance to the leaf that gives it the highest probability (act 316). The language model for each leaf may then be retrained (act 318) using any well-known conventional methods. Processing system 100 may then determine whether the models have converged (act 320). If the models have not converged, then acts 316 through 320 may be repeated. Otherwise, the similar-utterance processing is completed. The terminal set of leaves represent relatively homogeneous languages that may be easier to understand and describe than the full language model.

Similar-Utterance divides the data according to the structure of the language model. It does not in itself explain any changes in language, but further analysis can be performed on the resulting clusters or leaves. The recursive aspects of divisive clustering simplify the task of adapting or combining different algorithms. In particular, word-peeling may be used upon individual clusters or leaves, that are the result of performing the similar-utterance process, to discover internal changes in language. Thus, word-peeling becomes simply a special case (k=1) of a more elaborate algorithm that may uses both techniques to drive different stages of the clustering process. For example, with reference to the flowchart of FIG. 3, word-peeling may be combined with similar-utterance and performed in implementations consistent with the principles of the invention after convergence of the models has been determined to have occurred in act 320.

Cluster Analysis

Some clusters may consist of multiple instances of a handful of sentences, while others may consist mostly of long, rambling utterances that share a few words but no theme. Entropy may provide a simple measure of cluster heterogeneity. For example, lower entropy may indicate a cluster that is easier to understand and describe. Similar notions may include lexicon size and average utterance length.

The Word-Peeling Algorithm may provide a label for each cluster, namely a history of the splits that produced it. This can be valuable, depending on which particular presences and absences characterize the utterances. Knowing that all utterances in a cluster contain "balance", "much", and "how" makes an adequate label, knowing all utterances contain "to" and "I" but neither "bill" nor "yes" rather less so.

The comparison of cluster marginal distributions with those of the remainder of the full data set may provide a similar diagnostic. Typically, this may generate an unwieldy list of significant differences in word and meta-data probabilities. When filtered to present the most important changes, a helpful description of which covariate values are characteristic of the cluster members may be provided. Thus, a user may see words that strongly influenced the creation of the cluster, as well as any meta-data values that may be significantly over-represented. These can provide useful insight into the reasons underlying any changes.

Another method of summarizing clusters is to provide a few representative members. Some clustering processes require a "center" for each cluster. As the "most typical" member, the "center" makes a reasonable automatic label for the group, particularly if the cluster consists of meaningful units such as a particular class of utterances. Thus, a clustering process that provides cluster centers may be used on a set of transactions to provide several characteristic utterances.

An automated system can present a list of candidate clusters to a human being, but the final decision as to which are actually worth attention may require human judgment. Thus, the most objective measure of utility might be how much time an end-user needs to recognize and react to changes. In implementations consistent with the principles of the invention, detected changes may be prioritized and relevant information presented to the user to save much human time and effort.

Potential benefits of additional information about each cluster should be balanced against the demands placed upon the user.

Clustering Via Changed Measures of Association Between Words

Word counts across two domains may demonstrate significant differences in language. Should certain words tend to co-occur in the data dealing with some novel event, association scores among those words would increase. Association between words might not be informative since strong relationships can hold constant throughout the data. Interest may center on those words which display major changes in their associations within the language.

Searching for cliques of words with strong mutual associations may be unduly restrictive. Since near-synonyms tend to be negatively correlated, words fulfilling the same function may never belong to the same clique. Another issue is the high variability of association estimates, particularly for less common words or noisy data. One alternative is to view words by their relationships with many other words, seeking a similar pattern of changed associations. This would both allow words that seldom co-occur to be grouped together, and ameliorate the problem of noise by combining many pieces of evidence to make a final decision. Finding groups of similar words may simply include a clustering process with distance based on changes in some between-word association score. A cluster that includes multiple words with significant shifts in their relative frequencies suggests that some underlying semantic class causes these changes. Previous work has used co-occurrences to group words into semantic or functional classes. Implementations consistent with the principles of the invention may use data drawn from different domains to build a distance based upon changes in word usage.

A list such as Table I is a natural place to search for associations. Even a long and unwieldy set of observed changes will be an order of magnitude or two less than the total lexicon. The set of words that exhibited changes is small compared to the total lexicon, as is the set of common words. The union of the words that exhibited changes with the set of common words contains most of the unigram distribution mass and all of the words that appeared interesting. Yet, the union of words is still short enough that calculating the pairwise conditional associations of its elements is practical. This provides a process that clusters related changes within the language.

Figure 4:
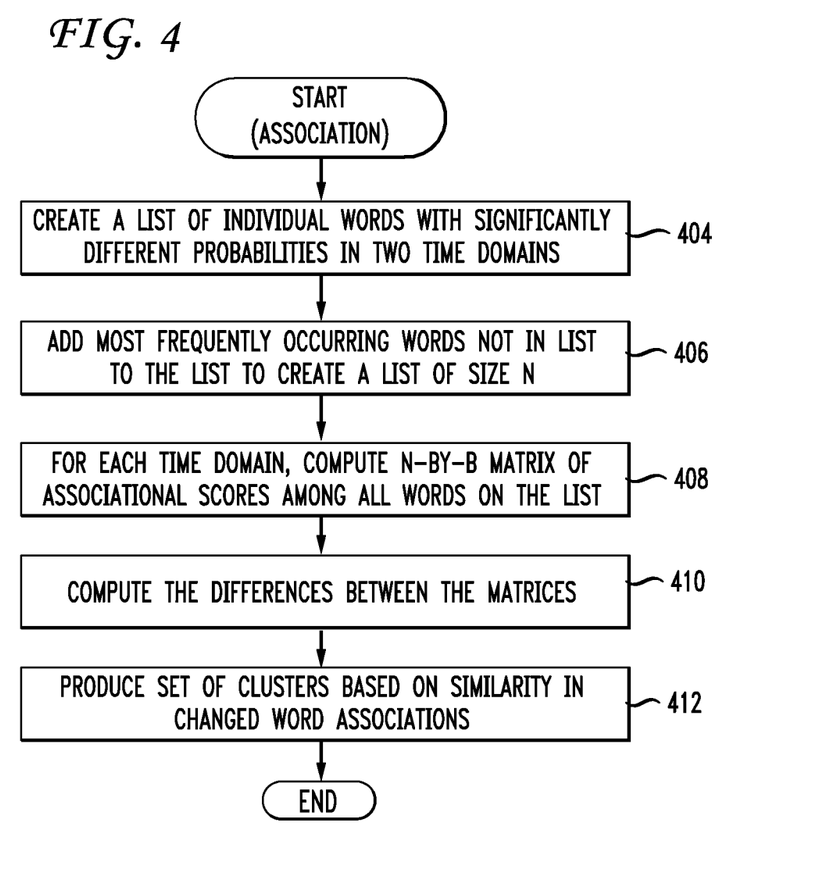

FIG. 4 is a flowchart that illustrates an exemplary process that may be used in implementations consistent with the principles of the invention. The process may begin with processing system 100 creating a list of individual words with significantly different probabilities in two time domains (act 404). Common words such as "to" and "the" may be eliminated from the list. Processing system 100 may add the most frequently observed words, that do not appear on the list, to the list to create a list of N words (act 406).

For each time domain, processing system 100 may compute a N-by-N matrix of associational scores among all the words of the combined list (act 408). That is, the matrix may show the computed associational scores that indicate a strength of an association between any two words of the group of words. The associational scores may be based on a probability of corresponding pairs of words appearing in the same utterance.

Next, processing system 100 may compute the difference between the matrices of the two time domains (act 410), thereby providing a measure of changed association for each pair of words. Processing system 100 may then produce a set of clusters based on similarity in changed word association (act 412). That is, pairs of words with similar changed word associations may be clustered together by processing system 100.

Figure 5:
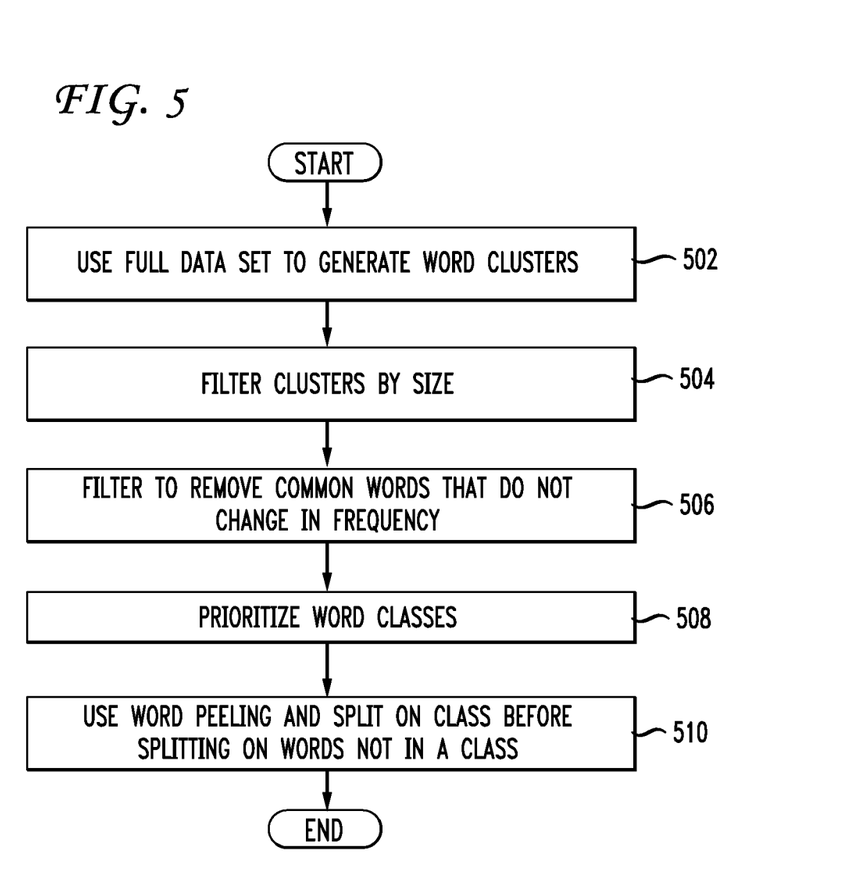

FIG. 5 is a flowchart that illustrates another exemplary process that may be performed in implementations consistent with the principles of the invention. The process of FIG. 5 combines a method of clustering with the word-peeling process. First, processing system 100 may use the full data set to generate word clusters or groups of words (act 502). This may be done by performing acts 404-412 of FIG. 4 or by other word clustering techniques. The word clusters may then be filtered by size (act 504). For example, clusters having more that a specific number of words may be omitted. In one implementation, consistent with the principles of the invention, the specific number of words may be 30. Processing system 100 may remove common words that do not change in frequency (act 506) and may prioritize word classes (act 508) using a combination of cluster size and proportion of changed words. Other prioritization schemes may also be used. Processing system 100 may then perform word peeling, splitting off clusters based on word classes (act 510).

Word-peeling may be modified to split words based on word classes instead of changes to individual words. For example, the word-peeling process, as illustrated in the flowchart of FIG. 2 may be modified, such that in act 206, processing system 100 may examine utterances from each time domain looking for significant word class changes and, in act 208, processing system 100 may determine whether any significant word class changes have occurred. In act 210, processing system 100 may split utterances in each domain into a cluster of utterances including the significant word class and a cluster of utterances not including the significant word class. Thus, first a cluster containing the most significant (or highest priority) word class may be split off, then another cluster containing the next most significant word class may be split off, and so on.

With respect to act 510, any class may be used to split the data before any word not in an extracted class. Scores of interesting classes may be added together to determine priority, and the data split using all members of the highest scoring class. If a class is found in every utterance, the words of the class may revert back to being scored and split as in the originally-described word-peeling process, shown in FIG. 2. Thus, interesting class members may have priority in dividing the data, thereby calling attention to changes relating to novel topics.

Although FIG. 5 illustrates using a clustering process, such as word clustering via changed lexical associations, being combined with the word-peeling process, in other implementations word clustering via changed lexical associations may be combined with other processes.

Other Embodiments

The above implementations consistent with the principles of the invention provide various methods by which information may be mined and data presented to an expert, such that changes in language may become easier for the expert to analyze. Other implementations may mine information and present data to an expert such that the language use among different groups of people may become easier for the expert to analyze.

For example, in existing spoken language dialog systems, a speech recognizer may convert spoken language to text or textual utterances. Techniques are well-known to those of skill in the art for predicting a gender of a speaker based on a frequency of the speaker's voice. Such a technique may be implemented in a speech recognizer, such that the output of the speech recognizer may include textual utterances and a corresponding label indicating the predicted gender of the speaker of each of the utterances. Further, the above-mentioned methods, such as word-peeling, similar utterance, clustering via changed measures of associations between words, or other algorithms or combinations of algorithms may be used to analyze language differences among the different groups of people, such as, for example, men and women.

For example, in one implementation of word peeling or similar utterance processing, utterances predicted to be from men and utterances predicted to be from women may be compared to determine significant word changes or word class changes from one group to another. Thus, language differences between the two groups may become easier to analyze.

Further, in another implementation consistent with the principles of the invention, utterances predicted to be from a particular group of people, for example, men, may be compared to utterances from the same group of people (.i.e., men), taken at a different time domain. Thus, such an implementation may help the human expert analyze changes in language used among the group of people, for example, men, from one time domain to another.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose'computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

CONCLUSION

Although the above description may contain specific details, it should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. Accordingly, the appended claims and their legal equivalents should only define the invention, rather than any specific examples given.

We claim:

1. A method comprising:
   selecting a plurality of language models;
   for each period of a plurality of time periods:
      identifying a first utterance and a second utterance received during each time period, wherein the first utterance was recognized using a first language model of the plurality of language models and the second utterance was recognized using a second language model of the plurality of language models;
      identifying distinctions between the first utterance and the second utterance for each of the plurality of time periods;
      determining when a significant word usage change has occurred within the first language model and the second language model by comparing the distinctions to previously recorded distinctions; and
      when the significant word usage change is detected:
         identifying a word corresponding to the significant word usage change;
         generating, from the utterances, a first cluster of utterances comprising the word;
         generating, from the utterances, a second cluster of utterances not comprising the word; and
         updating the plurality of language models using the first cluster of utterances and the second cluster of utterances.

2. The method of claim 1, wherein determining when the significant word usage change has occurred further comprises comparing ones of the utterances from a particular group of speakers associated with one of the plurality of time periods with ones of the utterances from the particular group of speakers from another time period of the plurality of time periods.

3. The method of claim 1, wherein determining when the significant word usage change has occurred further comprises comparing ones of the utterances from a first particular group of speakers with ones of the utterances from a second particular group of speakers.

4. The method of claim 1, wherein determining when the significant word usage change has occurred further comprises comparing ones of the utterances from one of the plurality of time periods with ones of the utterances from another of the plurality of time periods.

5. The method of claim 1, further comprising outputting a list of the utterances in the first cluster and the utterances in the second cluster with analytical information.

6. The method of claim 5, wherein the analytical information comprises a history of splits that produced each of the clusters.

7. The method of claim 1, wherein the plurality of time periods comprises two non-overlapping months.

8. The method of claim 1, further comprising iteratively performing:
examining a group of utterances from the second cluster of utterances, to yield examined utterances;
determining a next significant word change and a next word corresponding to the next significant word change;
generating, from the examined utterances, a new first cluster of utterances comprising the next word; and
generating, from the examined utterances, a new second cluster of utterances not comprising the next word corresponding to the next significant word change.

9. The method of claim 1, further comprising:
pooling the plurality of utterances from the plurality of time periods, to yield pooled utterances;
assigning each utterance of the pooled utterances to one of a plurality of subpopulations;
generating a language model for each of the plurality of subpopulations;
reassigning each utterance to one of the plurality of subpopulations according to a reassignment criterion;
determining whether any of the plurality of subpopulations fulfill a splitting criterion; and
splitting ones of the plurality of subpopulations that fulfill the splitting criterion, wherein:
examining a subset of the plurality of utterances from each of the time periods, determining one of a significant word change within the plurality of spoken utterances, generating, from the subset of the plurality of utterances, a first cluster of utterances including a word corresponding to the significant word change, and generating, from the subset of the plurality of utterances, a second cluster of utterances not including the word corresponding to the significant word change are performed after pooling, assigning, generating a language model, reassigning, determining whether any of the subpopulations fulfill the splitting criterion, and splitting.

10. The method of claim 9, wherein examining, determining when a significant word usage change has occurred, generating a first cluster, and generating a second cluster are performed for each of the plurality of subpopulations.

11. The method of claim 9, wherein:
assigning each utterance of the pooled utterances to one of the plurality of subpopulations further comprises:
assigning each of the utterances of the pooled utterances to one of two subpopulations;
reassigning each utterance of the pooled utterances to one of the plurality of subpopulations according to the reassignment criterion comprises reassigning each utterance of the pooled utterances to one of two subpopulations according to the reassignment criterion; and
splitting ones of the plurality of subpopulations that fulfill the splitting criterion comprises splitting ones of the subpopulations that fulfill the splitting criterion into two subpopulations.

12. The method of claim 9, further comprising:
iteratively performing, until the language models converge:
generating a language model for each of the subpopulations, and
reassigning each of the plurality of utterances to one of the subpopulations according to the reassignment criterion.

13. The method of claim 9, wherein the reassignment criterion comprises a subpopulation that maximizes a probability of an utterance occurring.

14. The method of claim 1, further comprising performing, before performing the acts of claim 1:
for each of the plurality of time periods, computing a matrix of associational usage scores among all words of a list of frequently occurring words;
computing differences in the associational scores of two of the matrices to produce a difference matrix;
producing a set of clusters of utterances based on similarity in associational usage scores of the difference matrix, to yield a produced set of clusters; and
creating a plurality of word classes based on a result of producing a set of clusters of utterances, wherein:
determining determines a significant word usage class change, and
generating the first cluster comprises generating, from the examined utterances, a cluster of utterances having a word class corresponding to the significant word class change.

15. The method of claim 14, further comprising:
prioritizing the first cluster of utterances and the second cluster of utterances.

16. A system comprising:
a processor; and
a computer readable storage medium having instructions stored which, when executed by the processor, cause the processor to perform operations comprising:
selecting a plurality of language models;
for each time period of a plurality of time periods:
identifying a first utterance and a second utterance received during each time period, wherein the first utterance was recognized using a first language model of the plurality of language models and the second utterance was recognized using a second language model of the plurality of language models;
identifying distinctions between the first utterance and the second utterance for each of the plurality of time periods;
determining when a significant word usage change has occurred within the first language model and the second language model by comparing the distinctions to previously recorded distinctions; and
when the significant word usage change is detected:
identifying a word corresponding to the significant word usage change;
generating, from the utterances, a first cluster of utterances comprising the word;
generating, from the utterances, a second cluster of utterances not comprising the word; and
updating the plurality of language models using the first cluster of utterances and the second cluster of utterances.

17. The system of claim 16, wherein determining when the significant word usage change has occurred further comprises comparing ones of the utterances from a particular group of speakers of one of the plurality of time periods with ones of the utterances from the particular group of speakers.

18. The system of claim 16, the computer-readable storage medium having additional instructions stored which, when executed by the processor, result in operations comprising:

iteratively performing:
: examining a group of utterances from the second cluster of utterances, to yield examined utterances;
determining a next significant word usage change and a next word corresponding to the next significant word usage change;
generating, from the examined utterances, a new first cluster of utterances comprising the next word; and
generating, from the examined utterances, a new second cluster of utterances not comprising the next word.

19. A computer-readable storage device having instructions stored which, when executed by a computing device, cause the computing device to perform operations comprising:
: selecting a plurality of language models;
for each time period of a plurality of time periods:
: identifying a first utterance and a second utterance received during each time period, wherein the first utterance was recognized using a first language model of the plurality of language models and the second utterance was recognized using a second language model of the plurality of language models;
identifying distinctions between the first utterance and the second utterance for each of the plurality of time periods;
determining when a significant word usage change has occurred within the first language model and the second language model by comparing the distinctions to previously recorded distinctions; and
when the significant word usage change is detected:
: identifying a word corresponding to the significant word usage change;
generating, from the utterances, a first cluster of utterances comprising the word;
generating, from the utterances, a second cluster of utterances not comprising the word; and
updating the plurality of language models using the first cluster of utterances and the second cluster of utterances.

20. The computer-readable storage device of claim 19, having additional instructions stored which, when executed by the computing device, result in preliminary operations to be executed by the computing device before the operations of claim 19, the preliminary operations comprising:
: for each time period of a plurality of time periods, computing a matrix of associational usage scores among all words of a list of frequently occurring words;
computing differences in the associational usage scores of two of the matrices to produce a difference matrix;
producing a set of clusters of utterances based on similarity in associational usage scores of the difference matrix, to yield a produced set of clusters; and
creating a plurality of word classes based on a result of producing a set of clusters of utterances, wherein:
determining determines a significant word class change, and generating the first cluster comprises generating, from the examined utterances, a cluster of utterances having a word class corresponding to the significant word class change.

* * * * *